United States Patent
Kaku

(10) Patent No.: US 11,682,389 B2
(45) Date of Patent: Jun. 20, 2023

(54) VOICE CONVERSATION SYSTEM, CONTROL SYSTEM FOR VOICE CONVERSATION SYSTEM, AND CONTROL PROGRAM, AND CONTROL METHOD

(71) Applicant: Toyota Jidosha Kabushiki Kaisha, Toyota (JP)

(72) Inventor: Wataru Kaku, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 329 days.

(21) Appl. No.: 16/781,651

(22) Filed: Feb. 4, 2020

(65) Prior Publication Data

US 2020/0251110 A1 Aug. 6, 2020

(30) Foreign Application Priority Data

Feb. 6, 2019 (JP) ................. JP2019-019745

(51) Int. Cl.
*G10L 15/22* (2006.01)
*G10L 25/63* (2013.01)
(Continued)

(52) U.S. Cl.
CPC .............. *G10L 15/22* (2013.01); *G06F 3/167* (2013.01); *G06V 40/174* (2022.01); *G06V 40/20* (2022.01);
(Continued)

(58) Field of Classification Search
CPC ..... G10L 15/22; G10L 13/00; G06K 9/00302; G06N 3/008; G06F 16/3329; G06F 2203/011
See application file for complete search history.

(56) References Cited

U.S. PATENT DOCUMENTS 9,375,845 B1 * 6/2016 Annan ................. B25J 11/0005
9,724,824 B1 * 8/2017 Annan ................. B25J 11/0005
(Continued)

FOREIGN PATENT DOCUMENTS

JP    2015-132878 A    7/2015
JP    2016-076007 A    5/2016
(Continued)

*Primary Examiner* — Mark Villena

(74) *Attorney, Agent, or Firm* — Dinsmore & Shohl LLP

(57) ABSTRACT

A voice conversation system for questioning a target person to encourage him/her to perform an action recommended for him/her including a response content determination unit that determines, when the questioning is performed, whether there has been a response assumed in advance from the target person in response to the questioning and ends the questioning when the response content determination unit determines that there has been a response assumed in advance from the target person, and an engagement level determination unit that calculates an engagement level, which indicates how enthusiastic the target person is in continuing a conversation, when the response content determination unit determines that there has been no response assumed in advance from the target person, and when the calculated engagement level is a first threshold or higher, questions the target person again, while when the calculated engagement level is lower than the first threshold, ends the questioning.

9 Claims, 9 Drawing Sheets

(51) Int. Cl.
*G06F 3/16* (2006.01)
*G06V 40/20* (2022.01)
*G06V 40/16* (2022.01)

(52) U.S. Cl.
CPC ........ *G10L 25/63* (2013.01); *G06F 2203/011* (2013.01); *G10L 2015/225* (2013.01); *G10L 2015/227* (2013.01); *G10L 2015/228* (2013.01)

(56) References Cited

U.S. PATENT DOCUMENTS

| | | | |
|---|---|---|---|
| 9,727,885 B1* | 8/2017 | Reier | G16H 70/20 |
| 9,921,574 B1* | 3/2018 | Annan | B25J 11/0005 |
| 10,714,081 B1* | 7/2020 | Miller | G10L 15/08 |
| 2007/0192910 A1* | 8/2007 | Vu | B25J 19/06 |
| | | | 700/245 |
| 2014/0074454 A1* | 3/2014 | Brown | G10L 15/08 |
| | | | 704/9 |
| 2016/0027278 A1* | 1/2016 | McIntosh | G08B 21/0423 |
| | | | 715/741 |
| 2016/0030834 A1* | 2/2016 | Brown | A63F 13/65 |
| | | | 463/36 |
| 2016/0299965 A1* | 10/2016 | Starr | G06F 16/9535 |
| 2017/0078224 A1 | 3/2017 | Chander et al. | |
| 2017/0125008 A1* | 5/2017 | Maisonnier | G06N 3/008 |
| 2017/0188979 A1* | 7/2017 | Volpe | A61B 5/6804 |
| 2017/0206064 A1* | 7/2017 | Breazeal | G06F 8/36 |
| 2018/0144649 A1* | 5/2018 | el Kaliouby | G06F 16/337 |
| 2019/0043623 A1* | 2/2019 | Watlington, IV | G16H 40/63 |
| 2019/0068526 A1* | 2/2019 | Xie | H04L 67/20 |
| 2019/0073547 A1* | 3/2019 | el Kaliouby | G06K 9/00302 |
| 2019/0187787 A1* | 6/2019 | White | G06F 3/013 |
| 2019/0190874 A1* | 6/2019 | Petrosian | G06F 16/29 |
| 2019/0198016 A1* | 6/2019 | McKenzie | G10L 15/19 |
| 2019/0224853 A1* | 7/2019 | Gewecke | B25J 9/16 |
| 2020/0114521 A1* | 4/2020 | Mahoor | B25J 13/003 |
| 2020/0178876 A1* | 6/2020 | Lam | A61B 5/744 |
| 2020/0293563 A1* | 9/2020 | Tsuruta | G06F 16/3329 |

FOREIGN PATENT DOCUMENTS

| | | |
|---|---|---|
| JP | 2017-073125 A | 4/2017 |
| JP | 2018-049132 A | 3/2018 |

* cited by examiner

VOICE CONVERSATION SYSTEM, CONTROL SYSTEM FOR VOICE CONVERSATION SYSTEM, AND CONTROL PROGRAM, AND CONTROL METHOD

CROSS REFERENCE TO RELATED APPLICATIONS

This application is based upon and claims the benefit of priority from Japanese patent application No. 2019-019745, filed on Feb. 6, 2019, the disclosure of which is incorporated herein in its entirety by reference.

BACKGROUND

The present disclosure relates to a voice conversation apparatus, a control apparatus for a voice conversation apparatus, a control program, and a control method.

A voice conversation apparatus that conducts a conversation with a user (target person) by performing voice recognition or language processing is known. Recently, in such a voice conversation apparatus, there has been a development that enables a target person to become familiar with the voice conversation apparatus without the target person being made to feel uncomfortable in conversations. Japanese Unexamined Patent Application Publication No. 2015-132878 discloses a conversation apparatus that acquires data indicating a user's action, calculates an expected value of a level of attention paid to information output to the user, and provides information by making a response or a display to the user.

SUMMARY

In a site where nursing care is provided, it has been found that it is extremely effective to question a target person and to encourage the target person to perform a recommended action in order to prevent the person from becoming bedridden. For this reason, an attempt has been made to introduce the above-described voice dialog system in a site where nursing care is provided and to question the target person using the voice conversation system. However, when questions are repeatedly asked without considering the state of the target person who has responded to the question, the target person may be made to feel uncomfortable.

The present disclosure has been made in view of the above circumstances. An object of the present disclosure is to provide a voice conversation system that can efficiently encourage a target person to perform a recommended action while reducing the possibility to make the target person uncomfortable.

An example aspect of the present disclosure is a voice conversation system for questioning a target person to encourage the target person to perform an action recommended for the target person including: a response content determination unit configured to determine, when the questioning is performed, whether there has been a response assumed in advance from the target person in response to the questioning and to end the questioning to the target person when the response content determination unit determines that there has been a response assumed in advance from the target person; and an engagement level determination unit configured to calculate an engagement level when the response content determination unit determines that there has been no response assumed in advance from the target person, and when the calculated engagement level is higher than or equal to a first threshold, question the target person again, while when the calculated engagement level is lower than the first threshold, end the questioning to the target person, the engagement level being an index indicating how enthusiastic the target person is in continuing a conversation.

In this voice conversation system, when there has been no response assumed in advance from the target person after the questioning is performed, the engagement level is calculated. When the calculated engagement level is higher than or equal to the first threshold, a question is asked to the target person again. In this way, it is possible to configure the voice conversation system not to question again when the target person does not wish to continue a conversation, i.e., when the engagement level is lower than the first threshold. By doing so, it is possible to efficiently encourage the target person to perform a recommended action while reducing the possibility to make the target uncomfortable.

When the engagement level determination unit determines that the calculated engagement level is higher than or equal to a second threshold, which is higher than the first threshold, the questioning may be performed again with the same wording as that of a previous question, while when the engagement level determination unit determines that the calculated engagement level is higher than or equal to the first threshold and lower than the second threshold, the questioning may be performed again with wording different from that of the previous question.

When the engagement level is higher than or equal to the second threshold, i.e., when the target person is very enthusiastic in continuing a conversation, the target person may not have understood the meaning of the question of the voice conversation system. In such a case, the voice conversation system questions the target person again with the same wording as that of the previous question. On the other hand, when the engagement level is higher than or equal to the first threshold and less than the second threshold, i.e., it does not mean that the target person does not desire to continue the conversation and the target person is not very enthusiastic in continuing the conversation, the questioning is performed again with wording different from that of the previous question. For example, the wording of the question to be asked again is changed to the one more intriguing for the target person than that of the previous question. By doing so, it is possible to efficiently encourage the target person to perform the recommended action.

The engagement level determination unit may be configured to calculate the engagement level according to a distance between the target person and the voice conversation system.

In order to appropriately conduct a conversation with the voice conversation system, the target person needs to conduct a conversation with the voice conversation system so that the distance between the target person and the voice conversation system becomes within a recommended distance. For this reason, when the target person is enthusiastic in continuing the conversation with the voice conversation system, it is considered that he/she responds to the question of the voice conversation system close in distance to the voice conversation system. That is, when the distance between the target person and the voice conversation system is short, the engagement level is considered to be higher than that when the distance is long. In this manner, there is a correlation between the distance between the target person and the voice conversation system and the engagement level. For this reason, the engagement level can be calculated according to the distance between the target and the voice conversation system when the target person responds to the question of the voice conversation system. By doing so, the engagement level can be accurately calculated.

The calculation of the distance between the target person and the voice conversation system may be performed based on an image photographed by a camera installed in an external system outside the voice conversation system.

The external system has a higher degree of freedom in regard to the installation than the voice conversation system. For example, when the external system is installed on the ceiling of a living room, the camera can photograph a wide area in the living room. Thus, a positional relationship between the target person and the voice conversation system can be accurately obtained from the image photographed by the camera installed in the external system than from an image photographed by a camera of the voice conversation system. That is, by calculating the distance between the target person and the voice conversation system based on the image photographed by the camera installed in the external system outside the voice conversation system, it is possible to further improve the accuracy of calculating the distance between the target person and the voice dialogue system. Thus, the engagement level can be accurately calculated.

The engagement level determination unit may be configured to calculate the engagement level in consideration of a content of a response made by the target person in response to the questioning. It is considered that the content of the response of the target person is correlated with the engagement level of the target person. For example, when the content of the response of the target person includes wording that denies the content of the question, the engagement level is calculated low. By doing so, the engagement level can be accurately calculated.

The engagement level determination unit may be configured to calculate the engagement level in consideration of a facial expression and a behavior of the target person in response to the questioning. It is considered that the facial expression of the target person is correlated with the engagement level of the target person. In the analysis of the facial expression of the target person, when a confused expression is detected, the engagement level is calculated to be lower. Furthermore, it is considered that the behavior of the target person is correlated with the engagement level of the target person. As the behavior of the target person, there may be a movement of limbs, in addition to the behavior related to the face such as verbal feedback during conversation, laughter, and nodding. As a result of analyzing the behavior of the target person, when such a confused behavior of the target person is detected, the engagement level may be calculated low. By doing so, the engagement level can be accurately calculated.

An example aspect of the present disclosure is a control system for a voice conversation system for questioning a target person to encourage the target person to perform an action recommended for the target person including: a response content determination unit configured to determine, when the questioning is performed by the voice conversation system, whether there has been a response assumed in advance from the target person in response to the questioning and to instruct the voice conversation system to end the questioning to the target person when the response content determination unit determines that there has been a response assumed in advance from the target person; and an engagement level determination unit configured to calculate an engagement level when the response content determination unit determines that there has been no response assumed in advance from the target person, and when the calculated engagement level is higher than or equal to a first threshold, instruct the voice conversation system to question the target person again, while when the calculated engagement level is lower than the first threshold, instruct the voice conversation system to end the questioning to the target person, the engagement level being an index indicating how enthusiastic the target person is in continuing a conversation. According to the above example aspect, it is possible to efficiently encourage the target person to perform a recommended action while reducing the possibility to make the target person surprised or uncomfortable.

An example aspect of the present disclosure is a control program of a voice conversation system for questioning a target person to encourage the target person to perform an action recommended for the target person, the computer program causing a computer of the voice conversation system to execute: determining, when the questioning is performed, whether there has been a response assumed in advance from the target person in response to the questioning and ending the questioning to the target person when it is determined that there has been a response assumed in advance from the target person; and calculating an engagement level when it is determined in the determining that there has been no response assumed in advance from the target person, and when the calculated engagement level is higher than or equal to a first threshold, questioning the target person again, while when the calculated engagement level is lower than the first threshold, ending the questioning to the target person, the engagement level being an index indicating how enthusiastic the target person is in continuing a conversation. According to the above example aspect, it is possible to efficiently encourage the target person to perform a recommended action while reducing the possibility to make the target person uncomfortable.

According to the present disclosure, it is possible to efficiently encourage a target person to perform a recommended action while reducing the possibility to make the target person uncomfortable.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to embodiments of the present disclosure, the present disclosure according to claims is not limited to the following embodiments. Moreover, all the components described in the following embodiments are not necessarily indispensable for solving problems. For the clarification of the description, the following description and the drawings may be omitted or simplified as appropriate. Throughout the drawings, the same components are denoted by the same reference signs and repeated descriptions will be omitted as appropriate.

First Embodiment

Hereinafter, a first embodiment of the present disclosure will be described with reference to the drawings.

Figure 1:
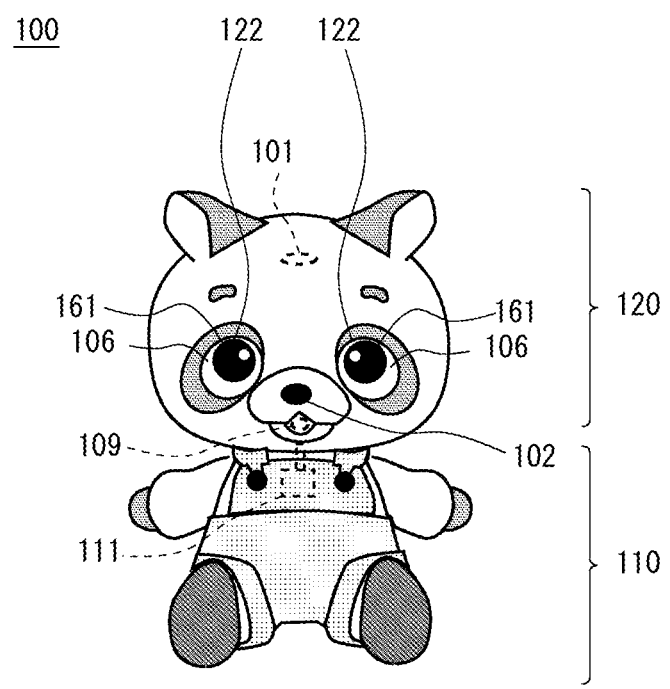
FIG. 1 is an overview diagram of a voice conversation apparatus according to embodiments.

FIG. 1 is an overview diagram of a voice conversation apparatus (system) 100 according to the first embodiment. The voice conversation apparatus 100 is a robot that questions a target person (user) and encourages the target person to perform a recommended action. The voice conversation apparatus 100 is a character apparatus that embodies a character and changes its facial expression and a line-of-sight direction according to a conversation.

The voice conversation apparatus 100 imitates an external appearance of an animal. The voice conversation apparatus 100 includes a body part 110 and a head part 120. A motor 111 is provided inside the body part 110, and an orientation of the head part 120 with respect to the body part 110 is changed by driving the motor 111. The head part 120 includes eyeball parts 122 at positions that the target person can recognize them as eyes. Display panels 106 such as a liquid crystal panel or an organic EL panel is installed behind the respective eyeball parts 122. A black eye image 161 is displayed on each of the display panels 106.

A camera 102 is disposed inconspicuously at a position of a nose of the voice conversation apparatus 100. The camera 102 includes, for example, a CMOS sensor and functions as an imaging unit that acquires an image for recognizing an external environment. A speaker 109 is disposed in a hidden manner at a position of a mouth of the voice conversation apparatus 100. The speaker 109 functions as a speech output unit that utters a voice generated by the voice conversation apparatus 100. The target person feels as if the voice conversation apparatus 100 is speaking from the voice output from the position of the mouth. Further, the microphone 101 is disposed in a hidden manner at any position of the head part 120. The microphone 101 functions as a detection unit that detects a spoken voice of the target person.

Figure 2:
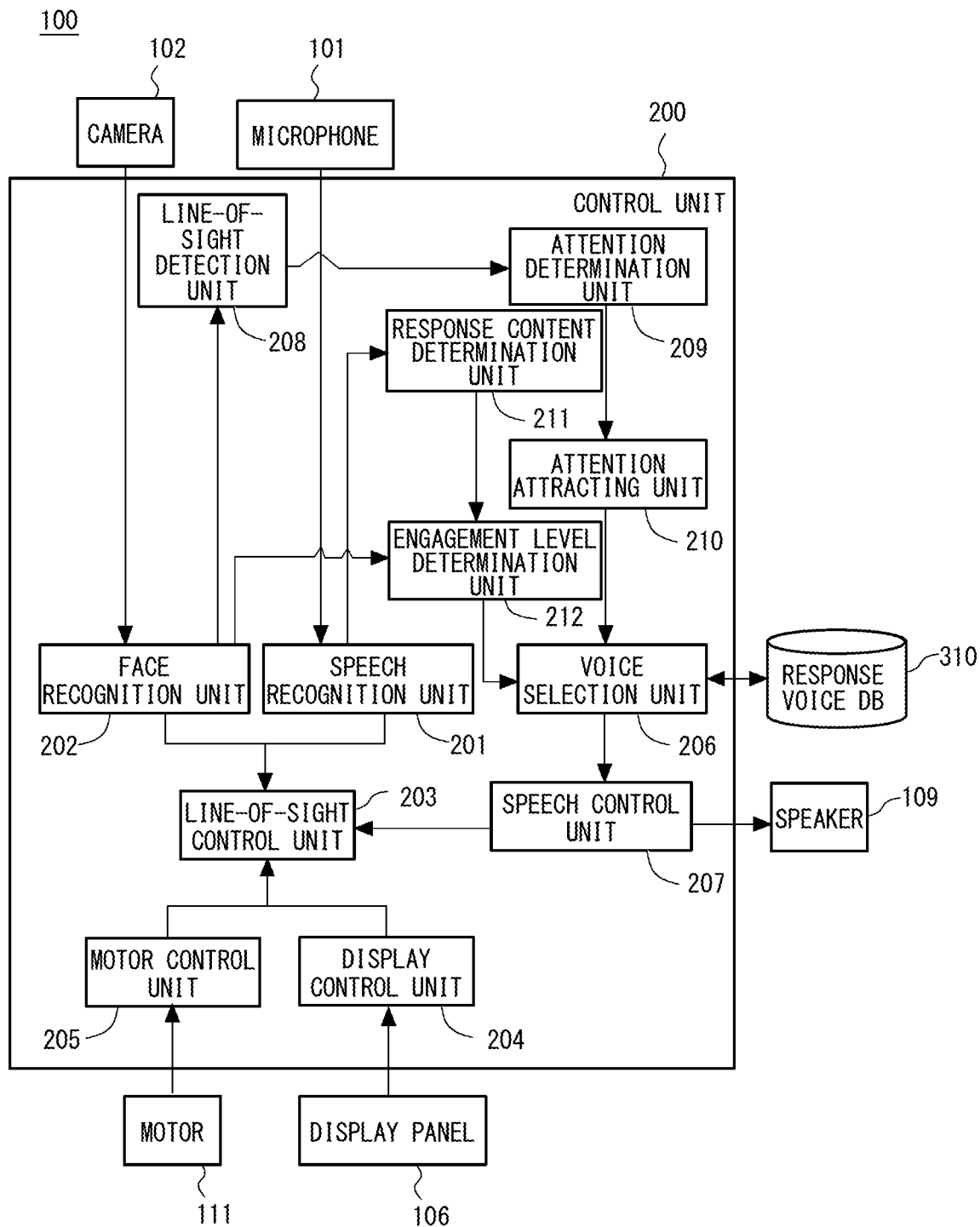
FIG. 2 is an apparatus configuration diagram of the voice conversation apparatus according to the embodiments.

FIG. 2 is an apparatus configuration diagram of the voice conversation apparatus 100. The voice conversation apparatus 100 includes the microphone 101, the camera 102, the display panels 106, the speaker 109, the motor 111, a control unit 200, and a response voice DB 310 as main apparatus configurations. The control unit 200 is composed of, for example, a CPU. The control unit 200 operates as a function execution unit responsible for execution of each function. The control unit 200 operates mainly as a speech recognition unit 201, a face recognition unit 202, a line-of-sight control unit 203, a display control unit 204, a motor control unit 205, a voice selection unit 206, a speech control unit 207, a line-of-sight detection unit 208, an attention determination unit 209, and an attention attracting unit 210.

The main function of the microphone 101 is to collect a spoken voice of the target person with whom the voice conversation apparatus 100 conducts a conversation. The microphone 101 converts the collected spoken voice of the target person into a voice signal and passes it to the speech recognition unit 201.

The speech recognition unit 201 analyzes the voice signal received from the microphone 101 and recognizes the target person's speech. The speech recognition unit 201 functions, in cooperation with the microphone 101, as a speech acquisition unit that acquires the target person's speech who is speaking to the voice conversation apparatus 100. Specifically, the speech recognition unit 201 recognizes a content of the target person' speech by common voice recognition technology. The speech recognition unit 201 passes the recognized speech content to the voice selection unit 206.

The voice selection unit 206 selects a sentence suitable as a conversation for the target person's speech content recognized by the speech recognition unit 201, collects speech data corresponding to the selected sentence from the response voice DB 310, and passes the speech data to the speech control unit 207. Further, in response to an instruction from the attention attracting unit 210 or an engagement level determination unit 212, the voice selection unit 206 selects a sentence for "questioning" that encourages the target person to perform an action recommended for the target person. Furthermore, the voice selection unit 206 selects a sentence for "calling out" to make the target person pay attention to the voice conversation apparatus in accordance with an instruction from the attention attracting unit 210.

The response voice DB 310 is a database connected to the voice selection unit 206 which stores response voices. The response voice DB 310 is composed of, for example, a recording medium of, for example, a hard disk drive. The response voice DB 310 is organized as, for example, a corpus, and each term is stored with reproducible speech data.

The speech control unit 207 converts the received speech data into a voice signal and passes the speech data to the speaker 109. The voice selection unit 206 and the speech control unit 207 function as a voice generation unit that generates a response voice based on the speech content of the target person. The speaker 109 receives the voice signal converted by the speech control unit 207 and outputs the response voice as a voice.

The speech recognition unit 201 passes a timing at which the target person has started to speak to the line-of-sight control unit 203. The speech control unit 207 passes a timing at which the response voice is output as a voice to the line-of-sight control unit 203. The line-of-sight control unit 203 executes adjustment of the line-of-sight direction in synchronization with such timing information.

A main function of the camera 102 is to photograph the target person who is having a conversation with the voice conversation apparatus 100. The camera 102 converts the photographed image into an image signal and passes the image signal to the face recognition unit 202.

The face recognition unit 202 analyzes the image signal received from the camera 102 and recognizes the target person's face. The face recognition unit 202 decides a reference direction of the target person from the extracted face areas. The reference direction is, for example, a direction from the voice conversation apparatus 100 to a midpoint connected between the eyes of the target person. In order to decide the reference direction, distance information about the distance from the voice conversation apparatus 100 to the target person (target person's face) is necessary, because the reference direction is represented by a vector in a three-dimensional space. For example, when the camera 102 is composed of a stereo camera, the distance information can be calculated from an amount of displacement between images, while when the camera 102 is composed of a camera that is sensitive to infrared rays, the distance information can be calculated from distortion of a projected infrared pattern. Any known technique can be selected according to the specification of the voice conversation apparatus 100 as a method for acquiring the distance information.

The line-of-sight control unit 203 performs control to direct the line-of-sight direction to the reference direction received from the face recognition unit 202 in synchronization with the timing received from the speech recognition unit 201, the speech control unit 207, or another timing. Specifically, the line-of-sight control unit 203 decides change amounts to cause the positions of the black eye images 161 to change and the orientation of the head part 120 to change in order to match the line-of-sight direction with the reference direction, and then passes them to the display control unit 204 and the motor control unit 205.

The display control unit 204 moves the positions of the black eye images 161 on the display panels 106 according to the change amounts of the positions of the black eye images 161 received from the line-of-sight control unit 203. The display control unit 204 generates intermediate display images in stages according to the magnitude of the received change amount, i.e., the distance to move the black eye images 161, and displays the black eye images 161 as an animation. The motor control unit 205 drives the motor 111 according to the change amount of the orientation of the head part 120 received from the line-of-sight control unit 203.

The line-of-sight detection unit 208 detects the line of sight of the target person. Specifically, the face recognition unit 202 extracts the eyes from the target person's face recognized by analyzing the signal of the image photographed by the camera 102, and estimates the line-of-sight direction of the target person. A known technique that can be used as a technique for estimating the line-of-sight direction of the target person include, for example, a technique based on a three-dimensional eyeball model or a technique based on an appearance of an eyeball. In the method based on the three-dimensional eyeball model, positions of an iris and a pupil are estimated by ellipse fitting and edge detection, and the line-of-sight direction is estimated by fitting the estimated eyeball with the three-dimensional eyeball model. In the method based on an appearance of an eyeball, an iris of the eye is not extracted from the image and instead a large amount of images of the eye area looking at various directions are collected, and the line-of-sight direction is estimated by learning the distribution of luminance values of the images. For example, a neural network is used for learning the distribution of luminance values.

The attention determination unit 209 determines whether an attention level is higher than a predetermined level based on information from the line-of-sight detection unit 208. Here, the attention level is an index of how much the target person is directing his/her line of sight to the voice conversation apparatus. The attention level is, for example, a length of time that the target person is directing his/her line of sight to the voice conversation apparatus in a predetermined period. That is, when the length of time during which the target person directs his/her line of sight to the voice conversation apparatus is longer or equal to a predetermined threshold, the attention determination unit 209 determines that the attention level is higher than the predetermined level, while when the length of time during which the target person directs his/her line of sight to the voice conversation apparatus is less than or equal to the predetermined threshold, the attention determination unit determines that the attention level is lower than the predetermined level. This enables an objective determination of the attention level of the target person.

When the attention level is higher than the predetermined level, the attention attracting unit 210 "questions" the target person, encourages the target person to perform a recommended action, while when the attention level is lower than the predetermined level, the attention attracting unit 210 calls out to the target person to make him/her pay attention to the robot. When the attention attracting unit "questions" the target person to perform a recommended action, the attention attracting unit 210 instructs the voice selection unit 206 to select a sentence for "questioning". When the attention attracting unit 210 "calls out" to the target person to make him/her pay attention to the voice conversation apparatus, it instructs the voice selection unit 206 to select a sentence for "calling out".

The response content determination unit 211 determines whether there has been a response assumed in advance from the target person in response to the question, and when the response content determination unit 211 determines that there has been a response assumed in advance from the target person, the response content determination unit 211 ends questioning the target person. The determination by the response content determination unit 211 about whether there has been a response assumed in advance from the target person in response to the question is performed by analyzing the response from the target person recognized by the speech recognition unit 201 with the rule-based or machine learning method. Here, the response assumed in advance is a response with a content indicating that the target person intends to perform a recommended action. The engagement level determination unit 212 calculates an engagement level when the response content determination unit 211 determines that there is no response assumed in advance from the target person. The engagement level is an index that indicates how enthusiastic the target person is in continuing the conversation. Further, when the engagement level determination unit 212 determines that the calculated engagement level is higher than or equal to a first threshold, the questioning is performed on the target person again, while when the engagement level determination unit 212 determines that the calculated engagement level is lower than a first threshold, the questioning to the target person is ended.

When the engagement level determination unit 212 determines that the calculated engagement level is higher than or equal to the first threshold and lower than the second threshold, a question may be asked again with wording different from that of the previous question. In this case, when the engagement level determination unit 212 determines that the engagement level is higher than or equal to a second threshold, which is higher than the first threshold, a question is asked again with the same wording as that of the previous question.

Next, the flow of processing of speaking to the target person in the voice conversation apparatus 100 will be described. In the following descriptions, FIG. 1 is referred to as appropriate.

Figure 3:
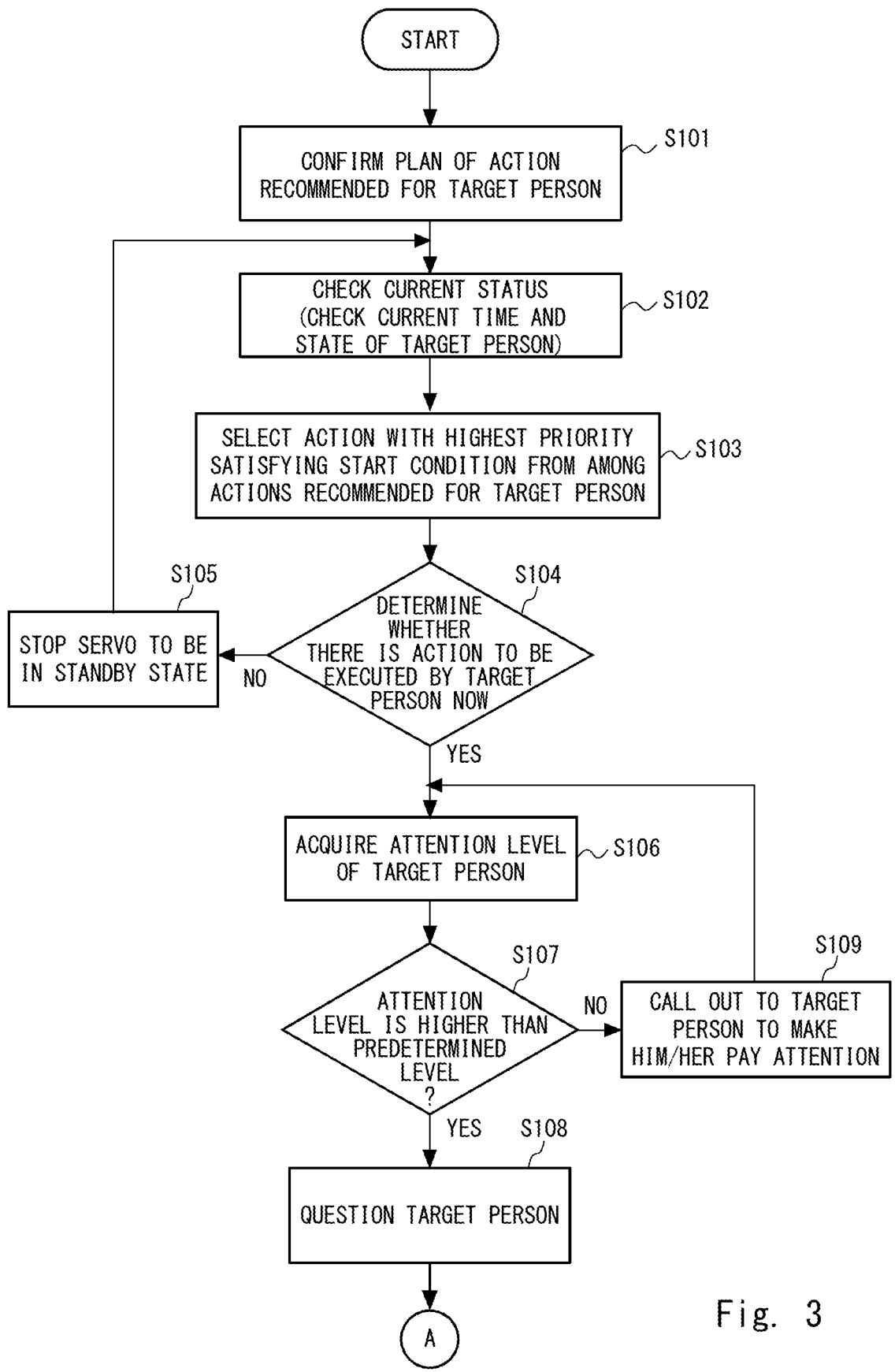
FIG. 3 is a flowchart showing a flow of processing of speaking to a target person in the voice conversation apparatus according to the embodiments.
Figure 4:
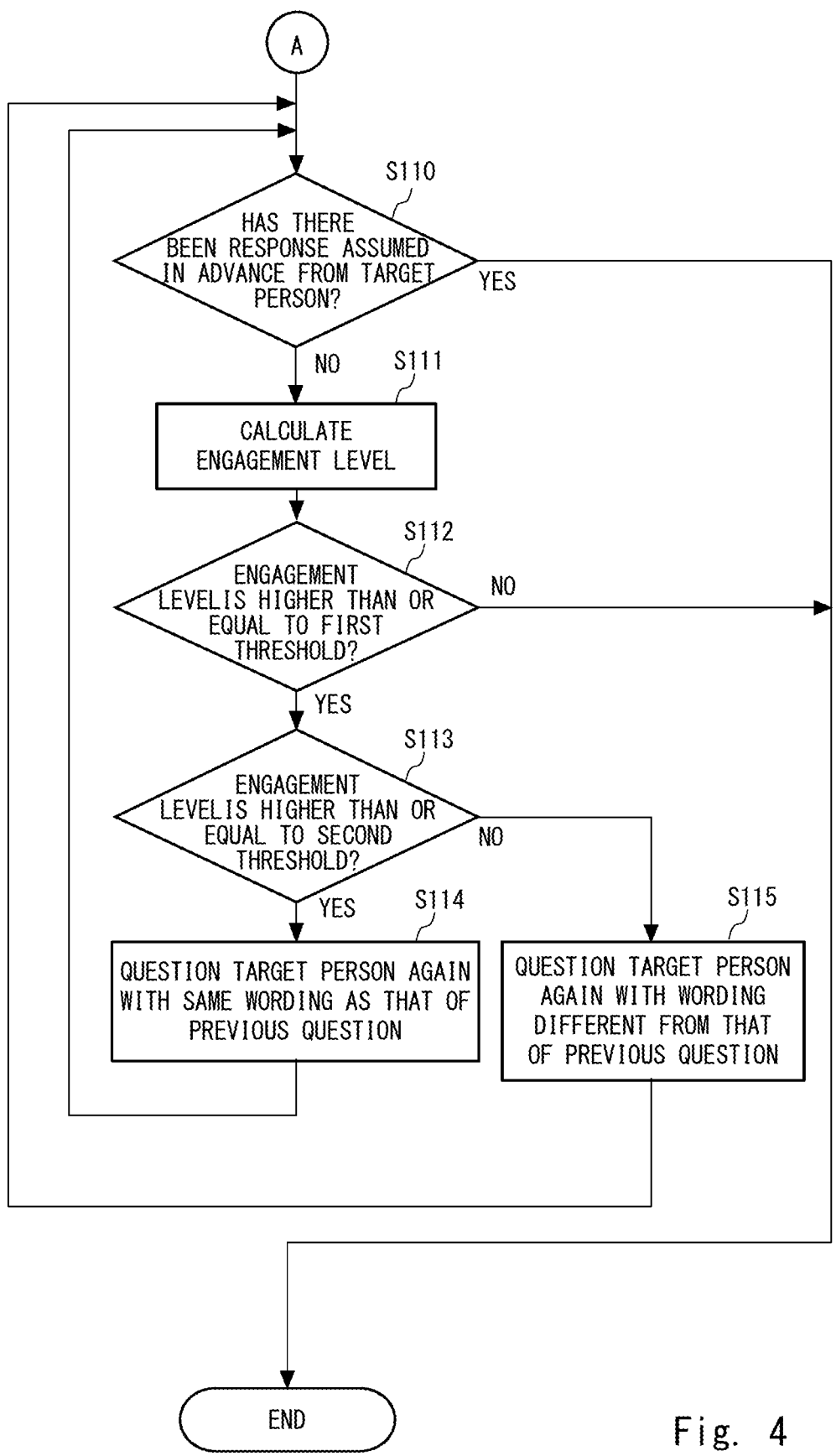
FIG. 4 is a flowchart showing a flow of processing of speaking to a target person in the voice conversation apparatus according to the embodiments.

FIGS. 3 and 4 are flowcharts showing the flow of processing to speak to the target person in the voice conversation apparatus 100. FIG. 3 shows processing (Step S101 to Step S109) until a question is asked to the target person to make him/her pay attention to the voice conversation apparatus. FIG. 4 shows processing after a question is asked to the target person to make him/her pay attention to the voice conversation apparatus (from Step S110 to Step S115).

As shown in FIG. 3, first, a plan of the action recommended for the target person is confirmed (Step S101). Here, the action recommended for the target person is, for example, when the target person is a resident of a nursing home, getting up, going to the dining room for breakfast, lunch, or dinner, doing routine exercises, or going to recreational activities, and going to take a bath. Note that the plan of an action recommended for the target person is an action schedule of the target person for the day. The plan of an action recommended for the target person is stored in advance in a memory or the like included in the voice conversation apparatus 100 and is referred to by the attention attracting unit 210 as appropriate. Next, a current status is checked (Step S102). Here, checking the current status means confirming the current time and confirming the state of the target person, i.e., checking whether the current time is a time that the target person should not be spoken to such as a nap time or whether the target person is in a state that he/she should not be spoken to such as he/she is on the phone.

Next, an action with the highest priority satisfying a start condition is selected from among the actions recommended for the target person (Step S103). Here, satisfying the start condition means that a difference between a scheduled start time of the action (or time recommended for performing the action) and the current time is within a predetermined time, and the target person is in a state that he/she may be spoken to. When there are a plurality of actions that satisfy the start condition, an action with the highest priority predetermined in the plan of the action recommended for the target person is selected. For example, when the action recommended for the target person at 15:00 is a recreational activity or bathing, the recreational activity is selected if the recreational activity is recommended more than the bathing in consideration of the target person's physical condition and other circumstances.

Next, it is determined whether there is an action to be executed by the target person now (Step S104). That is, it is determined whether there is an action selected in the processing of Step S103. In Step S104, when it is determined that there is no task to be executed, the servo is stopped to be in a standby state (Step S105), and the process returns to Step S102.

In Step S104, when it is determined that there is a task to be executed, the attention level, which is an index of the extent to which the target person is directing his/her eyes to the voice conversation apparatus 100, is acquired (Step S106). Next, it is determined whether the attention level is higher than a predetermined level (Step S107). In Step S107, when the attention level is higher than the predetermined level, a question is asked to encourage the target person to perform a recommended action (Step S108). In Step S107, when the attention level is lower than the predetermined level, the target person is called out to make him/her pay attention to the voice conversation apparatus (Step S109), and the process returns to Step S106.

After Step S108, as shown in FIG. 4, it is determined whether there has been a response assumed in advance from the target person (Step S110). In Step S110, when it is determined that there has been a response assumed in advance from the target person, the process is ended. In Step S110, when it is determined that there is no response assumed in advance from the target person, an engagement level is calculated (Step S111).

After Step S111, it is determined whether the engagement level is higher than or equal to the first threshold (Step S112). When it is determined in Step S112 that the engagement level is higher than or equal to the first threshold, it is determined whether the engagement level is higher than or equal to the second threshold (Step S113). When it is determined in Step S112 that the engagement level is lower than the first threshold, the process is ended.

When it is determined in Step S113 that the engagement level is higher than or equal to the second threshold, a question is asked to the target person again with the same wording as that of the previous question (Step S114), and the process returns to Step S110. When it is determined in Step S113 that the engagement level is lower than the second threshold, a question is asked to the target person again with wording different from that of the previous question (Step S115), and the process returns to Step S110.

Next, the processing of Step S110 in the flowchart shown in FIG. 4 (processing of determining whether there has been a response assumed in advance from the target person) will be described in detail.

Figure 5:
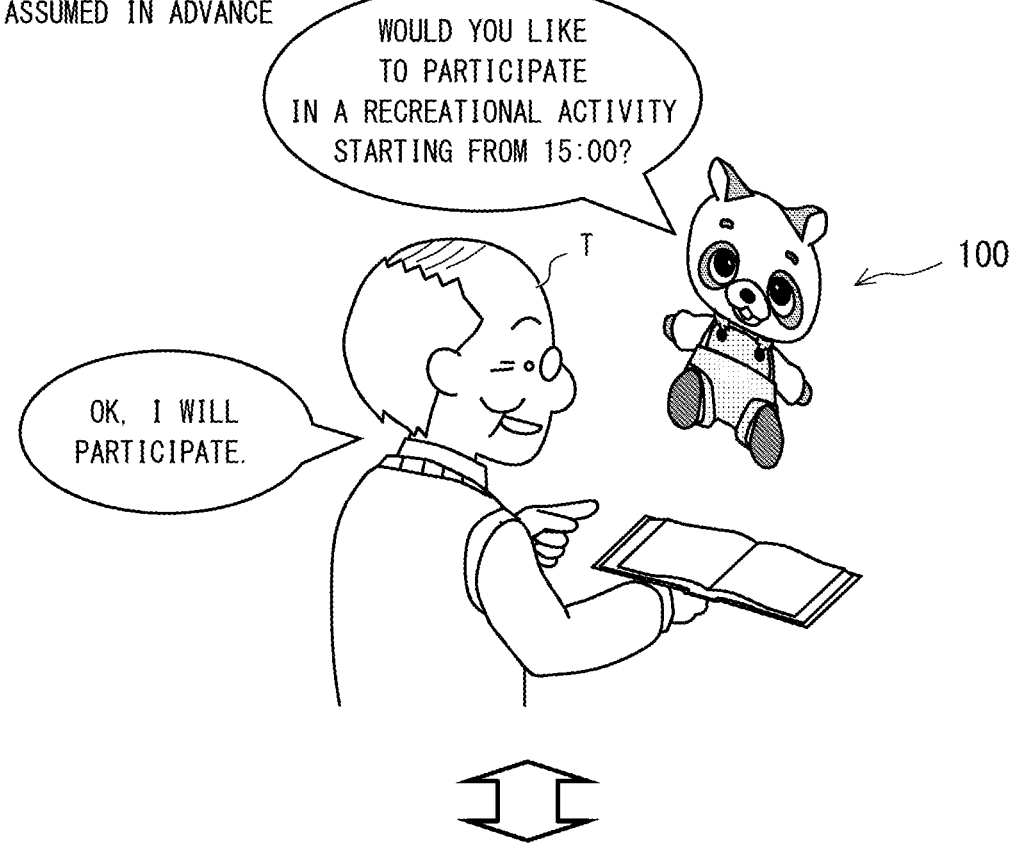
FIG. 5 is a schematic diagram describing details of processing of Step S110 in the flowchart shown in FIG. 4.
Figure 5:
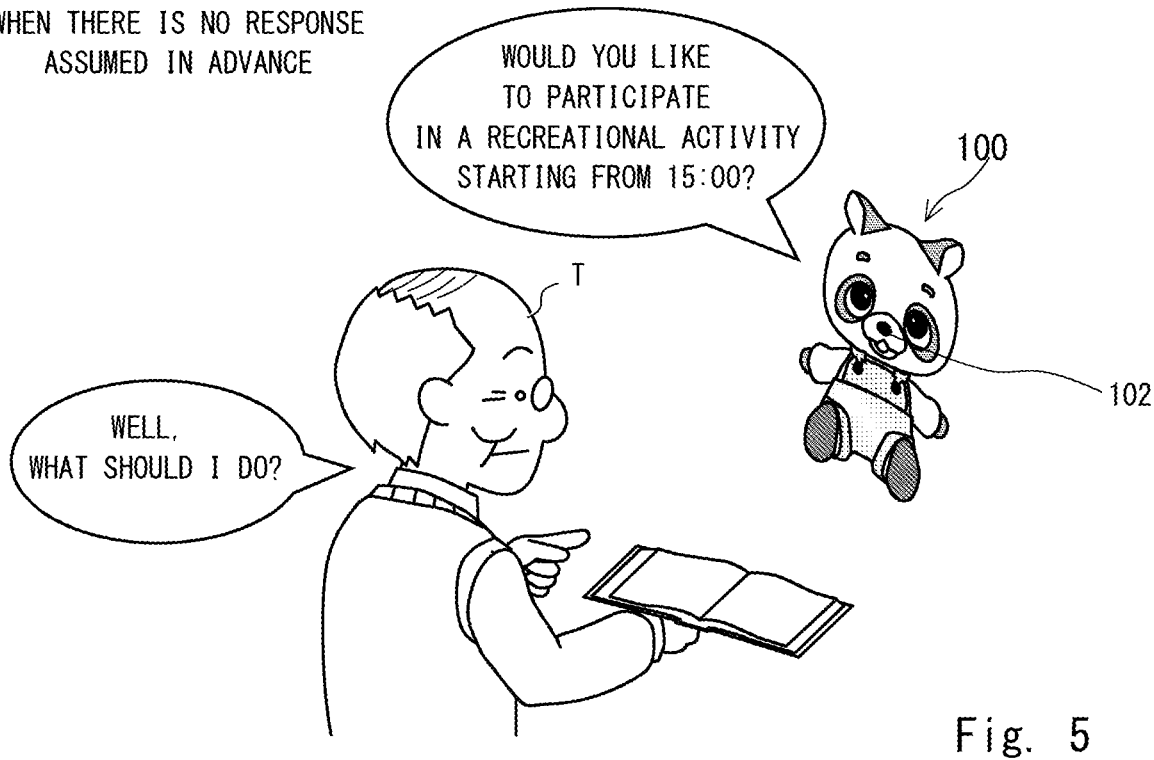

FIG. 5 is a schematic diagram describing details of the processing of Step S110 in the flowchart shown in FIG. 4. As shown in FIG. 5, suppose that the voice conversation apparatus 100 "questions" a target person T to encourage him/her to perform a recommended action such as "Would you like to participate in a recreational activity starting from 15:00?"

The response from the target person T in response to the question being a response assumed in advance means that, as shown in the upper part of FIG. 5, the response includes a content expressing that the target person intends to perform the action recommended for him/her, for example, "OK, I will participate". When such a response is made, a purpose of encouraging the target person to perform the recommended action has been achieved, and thus the voice conversation apparatus 100 ends the process of speaking to the target person.

The response from the target person T in response to the question not being a response assumed in advance means that, as shown in the lower part of FIG. 5, a response such as "Well, what should I do?" which does not include a content expressing that the target person intends to perform the recommended action. When such a response is made, the purpose of encouraging the target person to perform the recommended action has not been achieved, so the voice conversation apparatus 100 further performs the following process (Step S11 in FIG. 4).

Next, the processing of Step S111 (processing of calculating the engagement level) and the processing of Step S112 (processing of determining whether the engagement level is higher than or equal to the first threshold) in the flowchart shown in FIG. 4 will be described in detail.

Figure 6:
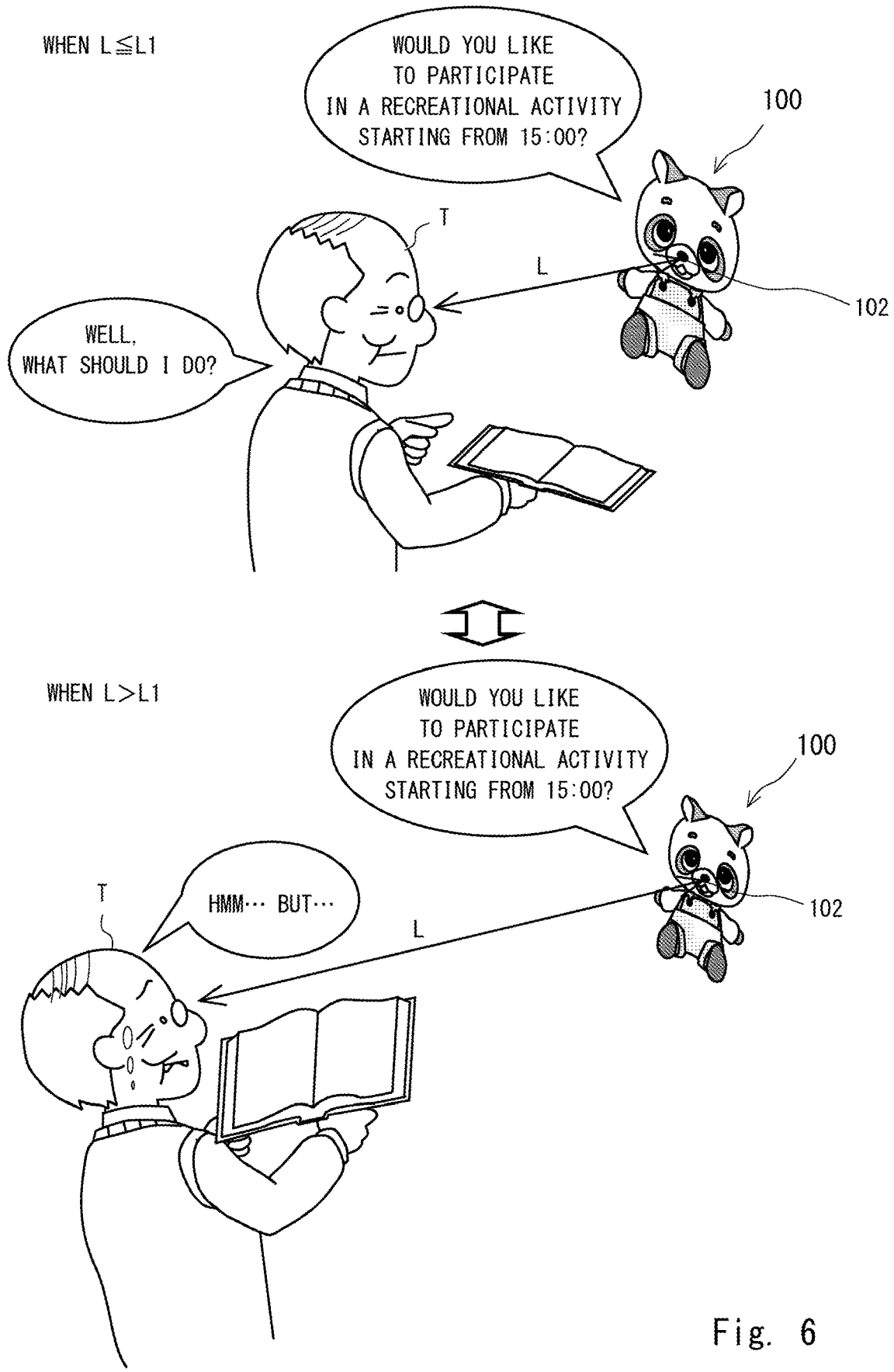
FIG. 6 is a schematic diagram describing details of processing of Step S111 and Step S112 in the flowchart shown in FIG. 4.

FIG. 6 is a schematic diagram describing details of the processing of Step S111 and Step S112 in the flowchart shown in FIG. 4. As shown in FIG. 6, the engagement level is determined by a distance L between the target person T and the voice conversation apparatus 100. Here, the distance L between the target person T and the voice conversation apparatus 100 is calculated by the face recognition unit 202 analyzing an image signal received from the camera 102.

In order to appropriately conduct a conversation with the voice conversation apparatus 100, the target person T needs to conduct a conversation with the voice conversation apparatus 100 so that the distance L between the target person T and the voice conversation apparatus 100 becomes within a recommended distance (e.g., 2 to 3 m). For this reason, when the target person T is enthusiastic in continuing the conversation with the voice conversation apparatus 100, it is considered that he/she responds to the question of the voice conversation apparatus 100 close in distance to the voice conversation apparatus 100. That is, when the distance L between the target person T and the voice conversation apparatus 100 is short, the engagement level is considered to be higher than that when the distance L is long. As discussed above, there is a correlation between the distance L between the target person T and the voice conversation apparatus 100 and the engagement level. For this reason, the engagement level can be calculated according to the distance L between the target T and the voice conversation apparatus 100 when the target person T responds to the question of the voice conversation apparatus 100.

Here, the distance L between the target person T and the voice conversation apparatus 100 corresponding to the first threshold is defined as a first distance L1. As shown in the upper part of FIG. 6, when the distance L between the target person T and the voice conversation apparatus 100 is less than or equal to the first distance L1, it is determined that the engagement level is higher than or equal to the first threshold. When such a determination is made, the voice conversation apparatus 100 further performs the following processing (Step S111 in FIG. 4). On the other hand, as shown in the lower part of FIG. 6, when the distance L between the target person T and the voice conversation apparatus 100 is longer than the first distance L1, it is determined that the engagement level is less than the first threshold. When such a determination is made, the voice conversation apparatus 100 determines that the target person T is not enthusiastic in continuing the conversation, and if the conversation is still forcibly continued, the target person T may be made to feel uncomfortable. Thus, the voice conversation apparatus 100 ends the processing of speaking to the target person T.

Next, the processing of Step S113 (processing of determining whether the engagement level is higher than or equal to the second threshold) in the flowchart shown in FIG. 4 will be described in detail.

Figure 7:
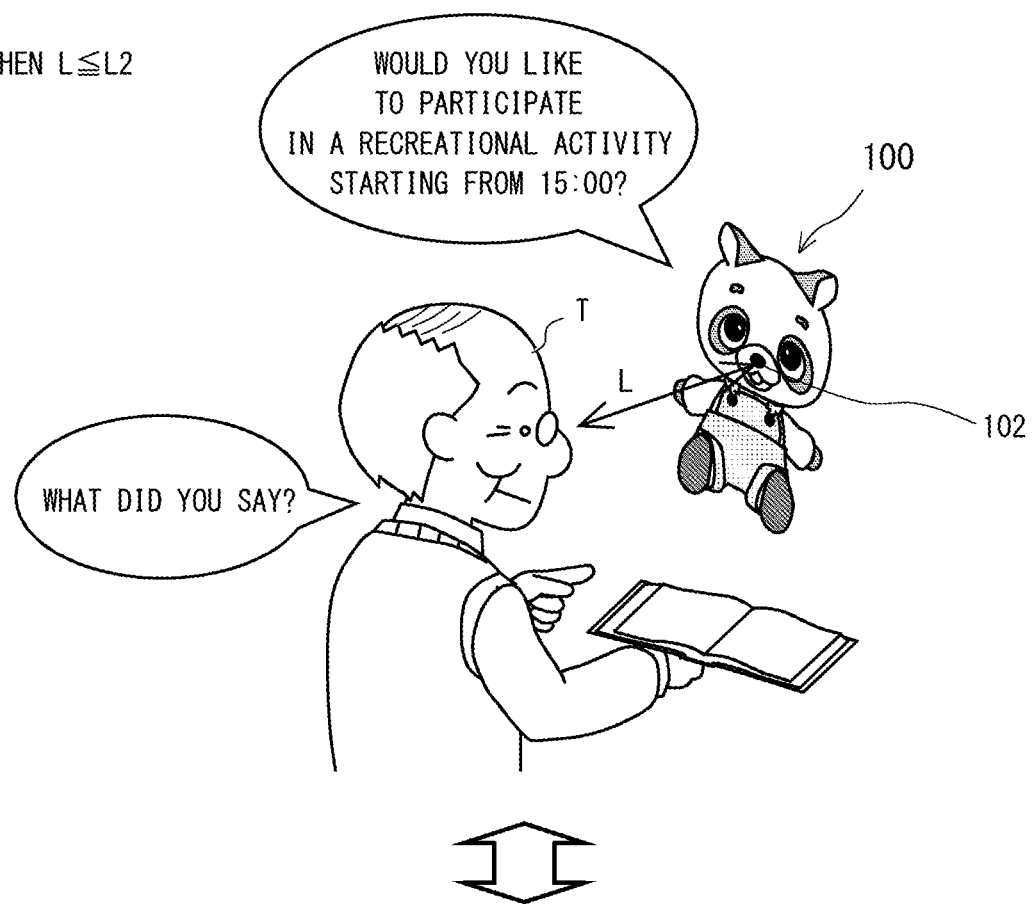
FIG. 7 is a schematic diagram describing details of processing of Step S113 in the flowchart shown in FIG. 4.
Figure 7:
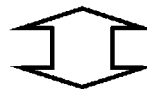
Figure 7:
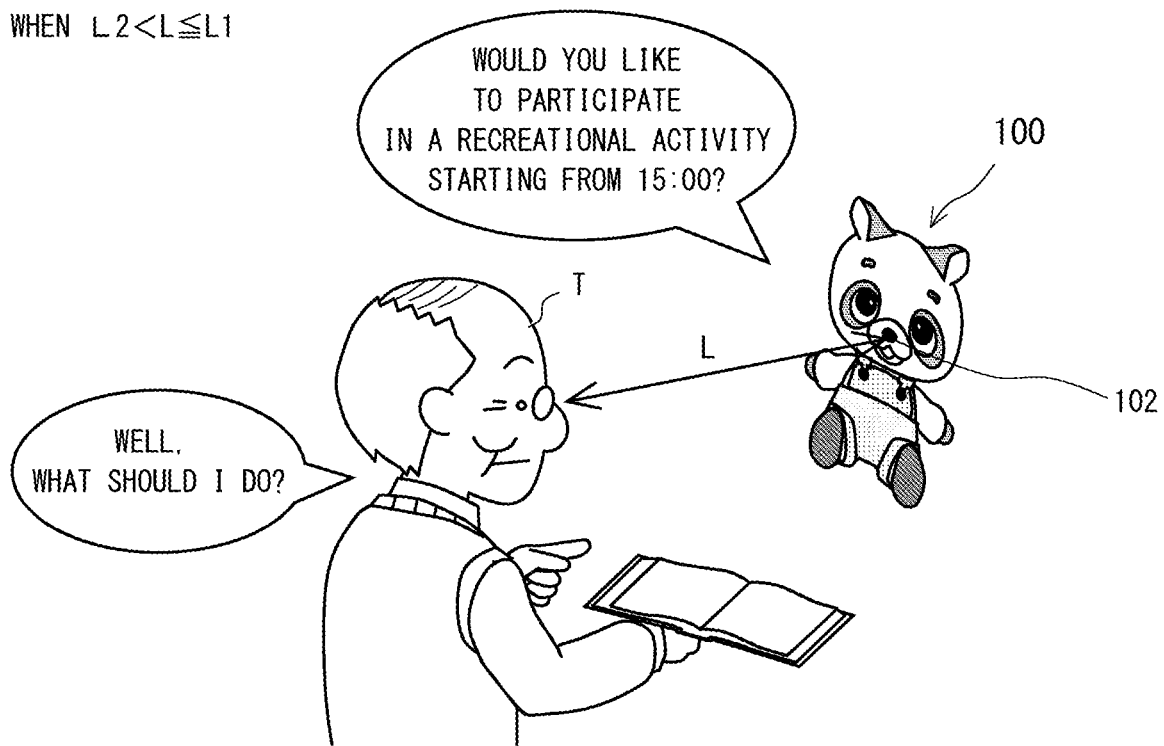

FIG. 7 is a schematic diagram describing the details of the processing of Step S113 in the flowchart shown in FIG. 4. Here, the distance L between the target person T and the voice conversation apparatus 100 corresponding to the first threshold is defined as a first distance L1, and the distance L that corresponds to the second threshold, which is higher than the first threshold and that is a distance is between the target person T and the voice conversation apparatus 100 is defined as a second distance L2.

As shown in the upper part of FIG. 7, when the distance L between the target person T and the voice conversation apparatus 100 is less than or equal to the second distance L2, it is determined that the engagement level is higher than or equal to the second threshold. That is, the engagement level is very high, and it is considered that the target person T is very enthusiastic in continuing the conversation. Thus, when the engagement level is as high as the second threshold or higher, the target person T may not have understood the meaning of the question of the voice conversation apparatus 100. In such a case, the voice conversation apparatus 100 questions the target person T again with the same wording as that of the previous question.

On the other hand, as shown in the lower part of FIG. 7, when the distance L between the target person T and the voice conversation apparatus 100 is longer than the second distance L2 and less than or equal to the first distance L1, the engagement level is determined that it is higher than or equal to the first threshold and less than the second threshold. In this way, when the engagement level of the target person T is not so low as he/she does not desire to continue the conversation and not so high as he/she is very enthusiastic in continuing the conversation, the questioning is performed again with wording different from that of the previous question. For example, when the previous question is "Would you like to participate in a recreational activity starting from 15:00?", the question to be asked again may be "The recreational activity starting from 15:00 is about singing songs, and it will be a stress reliever.", which the wording thereof would intrigue the target person T more than that of the previous question.

In the engagement level determination unit 212 shown in FIG. 2, the engagement level may be calculated in consideration of the content of the response of the target person in response to the question of the voice conversation apparatus 100 recognized by the speech recognition unit 201. It is considered that the response content of the target person in response to the question of the voice conversation apparatus 100 is correlated with the engagement level of the target person. For example, as shown in the lower part of FIG. 6, the response content of the target person T includes a negative word "hmm . . . but". When the response content of the target person includes wording that denies the content of the question, the engagement level determination unit 212 may calculate the engagement level low.

The face recognition unit 202 shown in FIG. 2 may further analyze the recognized facial expression of the target person, and the engagement level determination unit 212 may use a result of analyzing the facial expression to calculate the engagement level. The facial expression of the target person is considered to have a correlation with the engagement level of the target person. The facial expression is analyzed by a machine learning technique such as a neural network. For example, as shown in the lower part of FIG. 6, it can be seen that the facial expression of the target person T looks confused with the question. When such a confused expression is detected in the facial expression analysis by the face recognition unit 202, the engagement level determination unit 212 may calculate the engagement level low.

Further, in addition to the target person's face, the face recognition unit 202 may recognize a part other than the target person's face, and analyze the behavior of the target person. It is considered that the behavior of the target person has a correlation with the engagement level of the target person. As the behavior of the target person, there may be a movement of limbs, in addition to the behavior related to the face such as verbal feedback during conversation, laughter, and nodding. Then, the engagement level determination unit 212 may use a result of analyzing the behavior of the target person to calculate the engagement level. For example, as shown in the lower part of FIG. 6, the target person T hides his/her face with a book in his/her hands, and a confused behavior can be seen. In the analysis of the behavior by the face recognition unit 202, when such a confused behavior is detected, the engagement level determination unit 212 may calculate the engagement level low.

Modified Example 1

Figure 8:
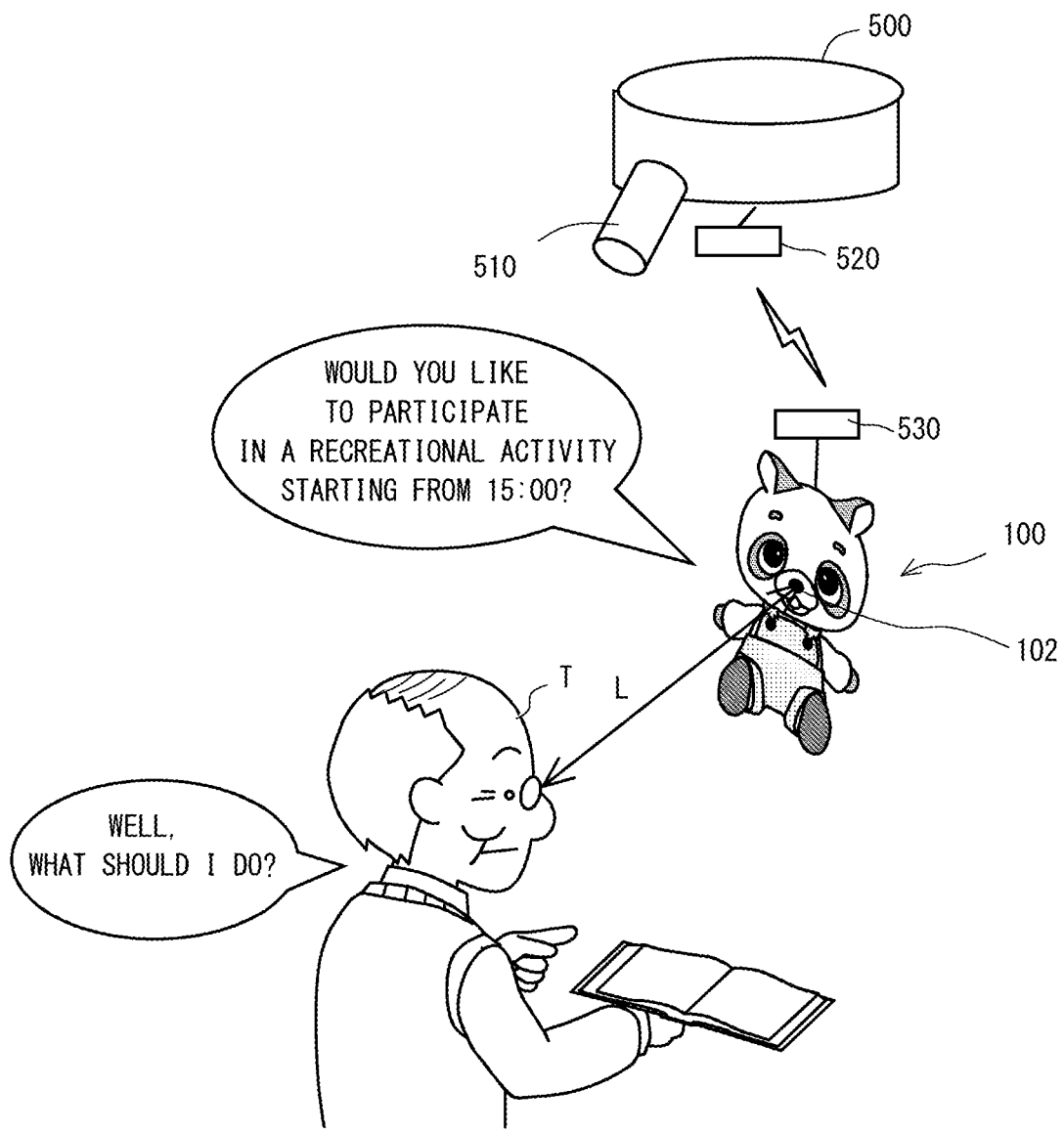
FIG. 8 is a schematic diagram showing an example of a configuration of an external apparatus.

The calculation by the face recognition unit 202 shown in FIG. 2 about the distance L between the target person T and the voice dialogue apparatus 100 may be performed based on an image photographed by a camera installed in the external apparatus outside the voice conversation apparatus 100. FIG. 8 is a schematic diagram showing an example of the configuration of the external apparatus 500. As shown in FIG. 8, the external apparatus 500 is installed on the ceiling of a living room. The external apparatus 500 includes a camera 510. The external apparatus 500 and the voice conversation apparatus 100 are connected to each other via wireless routers 520 and 530 for performing wireless communication. The camera 510 converts the photographed image into an image signal, and passes image data to the voice conversation apparatus 100 (specifically, the face recognition unit 202 of the control unit 200 shown in FIG. 2) via the wireless routers 520 and 530. The external apparatus 500 has a higher degree of freedom in regard to the installation than that of the voice conversation apparatus 100. For example, when the external apparatus 500 is installed on the ceiling of a living room, the camera 510 can photograph a wide area in the living room. Thus, a positional relationship between the target person T and the voice conversation apparatus 100 can be accurately obtained from the image photographed by the camera 510. Hence, by calculating the distance L between the target person T and the voice conversation apparatus 100 based on the image photographed by the camera installed in the external apparatus outside the voice conversation apparatus 100, it is possible to further improve the accuracy of calculating the distance L between the target person T and the voice dialogue apparatus 100.

Second Embodiment

Hereinafter, a second embodiment of the present disclosure will be described with reference to the drawings.

Figure 9:
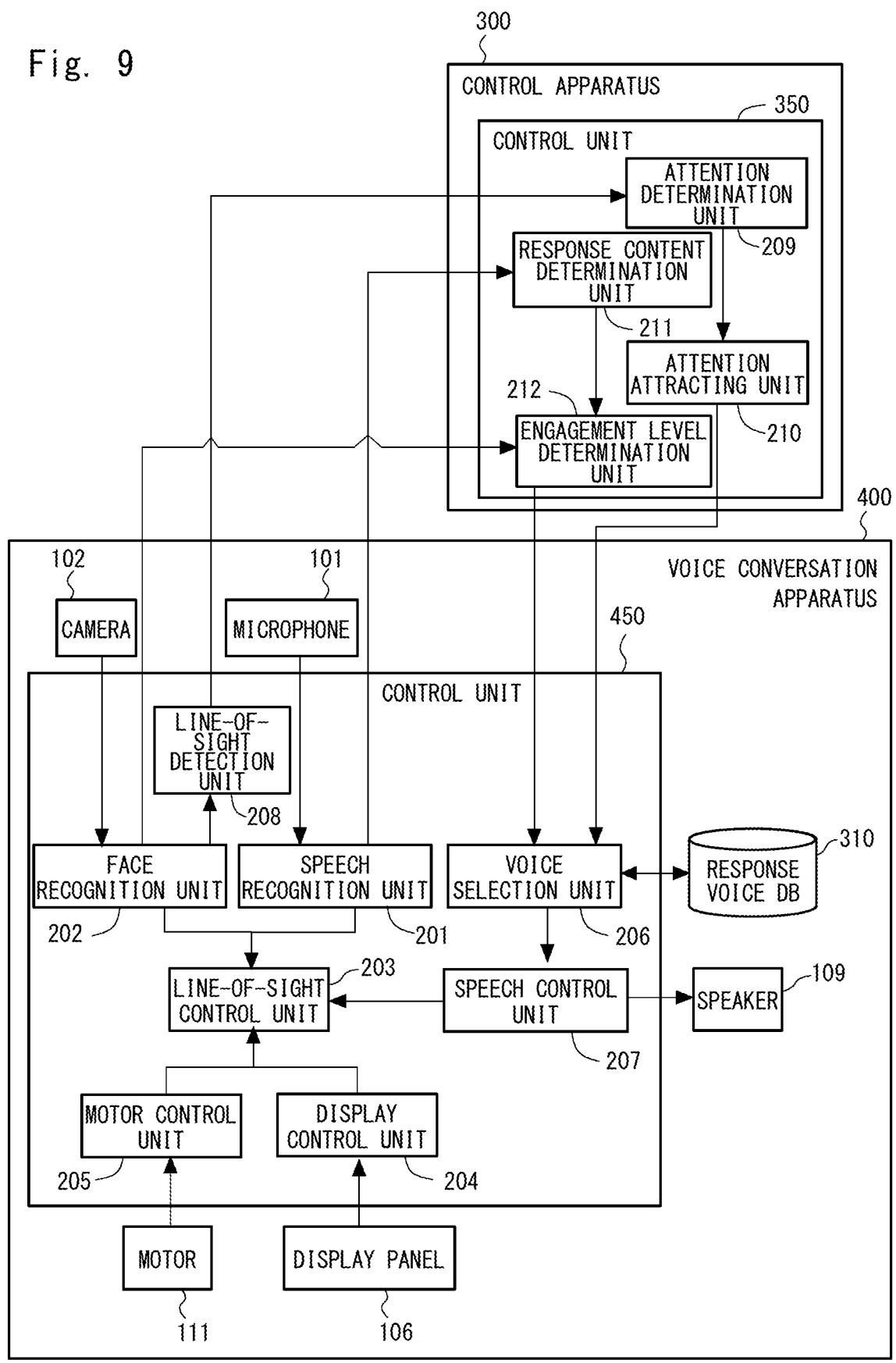
FIG. 9 is a block diagram for describing a configuration of a control apparatus according to a second embodiment.

FIG. 9 is a block diagram describing a configuration of a control apparatus (system) 300 according to a second embodiment. FIG. 9 also shows a configuration of a voice conversation apparatus (system) 400 to be controlled by the control apparatus 300. The only difference between the voice conversation apparatus 400 and the voice conversation apparatus 100 according to the first embodiment shown in FIG. 2 is that a control unit 450 in the voice conversation apparatus 400 does not include functional blocks of the attention determination unit, the attention attracting unit, the response content determination unit, and the engagement level determination unit. The control apparatus 300 according to the second embodiment includes these functional blocks, i.e., the attention determination unit 209, the attention attracting unit 210, the response content determination unit 211, and the engagement level determination unit 212 in the control unit 350 The control unit 300 is composed of, for example, a CPU. The voice conversation apparatus 400 implements the processing of speaking to a target person, which has been described with reference to FIGS. 3 and 4, under the control of the control apparatus 300. According to such a configuration, it is possible to efficiently encourage the target person to perform a recommended action while reducing the possibility to make the target person uncomfortable.

Note that the present disclosure is not limited to the above-described embodiment, and can be changed as appropriate without departing from the spirit of the present disclosure.

The processing of speaking to the target person according to the present disclosure can be implemented by causing a computer or the like to execute a program. More specifically, the processing of speaking to the target person according to the present disclosure is achieved by loading, in a computer included in any one of the voice conversation apparatus and the control apparatus, the program stored in a program memory and executing the program under control of a CPU. Here, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A voice conversation system for questioning a target person to encourage the target person to perform an action recommended for the target person, the voice conversation system comprising:
   a microphone configured to receive a response from the target person in response to questioning of the target person; and
   a processor configured to:
      generate a first question for performing the questioning;
      determine whether the response is a response assumed in advance from the target person in response to the questioning,
      end the questioning to the target person in response to determining that the response is a response assumed in advance from the target person,
      calculate an engagement level in response to determining that the response is not a response assumed in advance from the target person,
      in response to the calculated engagement level being greater than or equal to a first threshold, generate a second question for the target person, and
      in response to the calculated engagement level being less than the first threshold, end the questioning to the target person, wherein:
   the engagement level is an index indicating how enthusiastic the target person is in continuing the questioning.

2. The voice conversation system according to claim 1, wherein when the processor determines that the calculated engagement level is higher than or equal to a second threshold, which is higher than the first threshold, the questioning is performed again with the same wording as that of a previous question, while when the processor determines that the calculated engagement level is higher than or equal to the first threshold and lower than the second threshold, the questioning is performed again with wording different from that of the previous question.

3. The voice conversation system according to claim 1, wherein the processor is configured to calculate the engagement level according to a distance between the target person and the voice conversation system.

4. The voice conversation system according to claim 3, wherein calculation of the distance between the target person and the voice conversation system is performed based on an image photographed by a camera installed in an external system outside the voice conversation system.

5. The voice conversation system according to claim 1, wherein the processor is configured to calculate the engagement level in consideration of a content of a response made by the target person in response to the questioning.

6. The voice conversation system according to claim 1, wherein the processor is configured to calculate the engagement level in consideration of a facial expression and a behavior of the target person in response to the questioning.

7. A control system for a voice conversation system for questioning a target person to encourage the target person to perform an action recommended for the target person, the control system comprising:
  a microphone configured to receive a response from the target person in response to questioning of the target person; and
a processor configured to:
  generate a first question for performing the questioning;
  determine whether the response is a response assumed in advance from the target person in response to the questioning,
  end the questioning to the target person in response to determining that the response is a response assumed in advance from the target person,
  an engagement level determination unit configured to:
  calculate an engagement level in response to determining that the response is not a response assumed in advance from the target person,
  in response to the calculated engagement level being greater than or equal to a first threshold, generate a second question for the target person, and
    in response to the calculated engagement level being less than the first threshold, end the questioning to the target person, wherein:
  the engagement level being an index indicating how enthusiastic the target person is in continuing the questioning.

8. A computer-readable non-transitory storage medium storing a control program of a voice conversation system for questioning a target person to encourage the target person to perform an action recommended for the target person, the control program causing a computer of the voice conversation system to execute:

generating, by a processor, a first question for performing questioning to the target person;
receiving, by a microphone, a response from the target person in response to the questioning;
determining, by the processor, whether the response is a response assumed in advance from the target person in response to the questioning;
ending, by the processor, the questioning to the target person in response to determining that the response is a response assumed in advance from the target person;
calculating, by the processor, an engagement level in response to determining that the response is not a response assumed in advance from the target person;
in response to the calculated engagement level being greater than or equal to a first threshold, generating, by the processor, a second question for the target person; and
in response to the calculated engagement level being less than the first threshold, ending, by the processor, the questioning to the target person, wherein the engagement level is an index indicating how enthusiastic the target person is in continuing the questioning.

9. A method of a voice conversation system for questioning a target person to encourage the target person to perform an action recommended for the target person, the method comprising:
generating, by a processor, a first question for performing questioning to the target person;
receiving, by a microphone, a response from the target person in response to the questioning;
determining, by the processor, whether the response is a response assumed in advance from the target person in response to the questioning;
ending, by the processor, the questioning to the target person in response to determining that the response is a response assumed in advance from the target person;
calculating, by the processor, an engagement level in response to determining that the response is not a response assumed in advance from the target person;
in response to the calculated engagement level being greater than or equal to a first threshold, generating, by the processor, a second question for the target person; and
in response to the calculated engagement level being less than the first threshold, ending, by the processor, the questioning to the target person, wherein the engagement level is an index indicating how enthusiastic the target person is in continuing the questioning.

* * * * *